US005659349A

United States Patent [19]
Albano et al.

[11] Patent Number: 5,659,349
[45] Date of Patent: Aug. 19, 1997

[54] STATIC DISSIPATING MEMBER FOR IMAGING APPARATUS

[75] Inventors: Thomas Albano, Churchville; Mark E. Bridges, Spencerport, both of N.Y.

[73] Assignee: Eastman Kodak Company, Rochester, N.Y.

[21] Appl. No.: 392,465

[22] Filed: Feb. 22, 1995

[51] Int. Cl.$^6$ ........................................................ B41J 2/47
[52] U.S. Cl. ................................................ 347/260; 347/242
[58] Field of Search ............................ 347/257, 258, 347/242, 260, 262, 135

[56] References Cited

U.S. PATENT DOCUMENTS

| | | | |
|---|---|---|---|
| 4,439,781 | 3/1984 | Yano | 347/140 |
| 4,479,133 | 10/1984 | Shiozawa et al. | 347/38 |
| 4,494,166 | 1/1985 | Billings et al. | |
| 4,698,647 | 10/1987 | Gerlach | 347/38 |
| 5,255,408 | 10/1993 | Blackman | |
| 5,354,607 | 10/1994 | Swift et al. | |
| 5,359,750 | 11/1994 | Vantine | |

*Primary Examiner*—Benjamin R. Fuller
*Assistant Examiner*—Thinh Nguyen
*Attorney, Agent, or Firm*—Milton S. Sales

[57] ABSTRACT

An imaging apparatus has a support shoe with an at-least-partially cylindrical inner surface for receiving a recording media, a rotor which is simultaneously rotatable about and linearly translated along a fixed axis, a write head assembly carried by the rotor to write on recording media received on the inner surface of the support shoe, a member having an arcuate outer periphery and supported within the support shoe for movement along the fixed axis, and electrically conductive bristles extending radially from the periphery of the member toward the received media to dissipate electrostatic charge build up on the media. The member is supported for movement with the rotor, and preferably leads the rotor as the rotor moves along the axis during a write operation. The bristles extend radially from the periphery of the member and are spaced from the received media to create an electrical stress in free air space. The bristles are attached to an electrically conductive strip that is attached by adhesive to the periphery of the member to lie flat against the periphery, and the bristles bend away from the member.

12 Claims, 9 Drawing Sheets

STATIC DISSIPATING MEMBER FOR IMAGING APPARATUS

CROSS-REFERENCE TO RELATED APPLICATIONS

Reference is made to commonly assigned, co-pending U.S. Pat. No. 5,392,662, issued Feb. 28, 1995, entitled LEADSCREW COUPLER filed in the names of Jadrich et al. on Sep. 20, 1993; Ser. No. 08/123,839 entitled METHOD AND APPARATUS FOR EXPOSING PHOTOSENSITIVE MEDIA WITH MULTIPLE LIGHT SOURCES filed in the names of Smith et al. on Sep. 20, 1993; Ser. No. 08/371,241 entitled DIGITAL PRINTER WITH SUPPORT SHOE AND TRANSLATABLE MEDIA GUIDE MEMBER THEREIN filed in the name of M. Bridges on Jan. 11, 1995; Ser. No. 08/371,346, entitled PRINTER WITH SUPPORT SHOE AND MEDIA METERING THEREIN, filed in the name of M. Bridges on Jan. 11, 1995; and Ser. No. 08/371,307; entitled PRINTER WITH SUPPORT SHOE AND EXIT MEDIA GUIDE MEMBER filed in the name of M. Bridges on Jan. 11, 1995.

BACKGROUND OF THE INVENTION

1. Technical Field

The present invention relates generally to imaging apparatus such as printers and copiers that form media into a cylindrical shape for exposure by a rotating light source, and more particularly to a static elimination system for reducing static electrical charges on the surface of media in the imaging apparatus.

2. Background Art

Digital imaging in printers and copiers is accomplished by modulating the intensity of a light beam that forms a writing spot on photosensitive media as the beam moves relative to the photosensitive media. One type of imaging apparatus uses a modulated array of light emitting diodes (LED's) positioned on a write head assembly resident on a rotor which is simultaneously rotated about a fixed axis and linearly translated past stationary photosensitive recording media mounted on the inner surface of a cylindrical "support shoe" to form a plurality of writing spots moving across the photosensitive material in a fast scan direction and in a slow scan direction, such as disclosed in commonly assigned, co-pending U.S. patent application Ser. No. 08/371,241, entitled DIGITAL PRINTER WITH SUPPORT SHOE AND TRANSLATABLE MEDIA GUIDE MEMBER THEREIN filed in the name of M. Bridges on Jan. 11, 1995. The disclosure of the Bridges patent application is hereby specifically incorporated herein by reference.

Static electrical charges are triboelectrically generated on a dielectric material by contact with charged rollers or by frictional contact with stationary guide surfaces necessary to transport the material through a handling apparatus. The build-up of these charges can be a severe problem, particularly in photographic printing, as light produced during static discharge through air will expose the photosensitive surface of the media. Such static electrical charges can cause the material to be attracted to portions of the handling apparatus, thus interfering with proper functioning of the apparatus. Additionally, the static electrical charges may attract dust. Nearby electronics may be susceptible to electrostatic discharge or field induced transients. Finally, there is a need to prevent discharge of static energy from the surface of the media to the LED array, as such discharge may cause improper illumination of the LED's during printing.

Thus, many types of devices have been used to reduce or remove static electricity on a dielectric material. For example, U.S. Pat. No. 4,494,166, which issued to Billings et al. on Jan. 15, 1985, discloses a paper handling apparatus for a printing machine that uses grounded carbon bristle brush static eliminators. Such brushes are well known and widely used. The tips of such brushes need not touch the media. They operate by concentrating field lines so as to locally exceed the breakdown strength of air. The field lines, caused by the charges on the media, will preferably end at the grounded tips of the brush bristles. This is equivalent to a high field strength in the tip region.

DISCLOSURE OF THE INVENTION

It is an object of the present invention to provide for the dissipation of electrostatic charge on the media surface by a unique angularly-stationary or rotating disc mechanism which incorporates conducting bristles, such as for example carbon or stainless steel bristles, in which an electrical stress is created in free air space by the proximity of electrostatic dissipating disc(s) to the electrostatically charged media.

According to a feature of the present invention, an imaging apparatus has a support shoe with an at-least-partially cylindrical inner surface for receiving a recording media, a rotor which is simultaneously rotatable about and linearly translated along a fixed axis, a write head assembly carried by the rotor to write on recording media received on the inner surface of the support shoe, a member having an arcuate outer periphery and supported within the support shoe for movement along the fixed axis, and electrically conductive bristles extending radially from the periphery of the member toward the received media to dissipate electrostatic charge build up on the media.

According to a preferred embodiment of the present invention, the member is supported for movement with the rotor, and preferably leads the rotor as the rotor moves along the axis during a write operation. The bristles extend radially from the periphery of the member and are spaced from the received media to create an electrical stress in free air space. The bristles are attached to an electrically conductive strip that is attached by adhesive to the periphery of the member to lie flat against the periphery, and the bristles bend away from the member.

The invention, and its objects and advantages, will become more apparent in the below description of the preferred embodiments.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
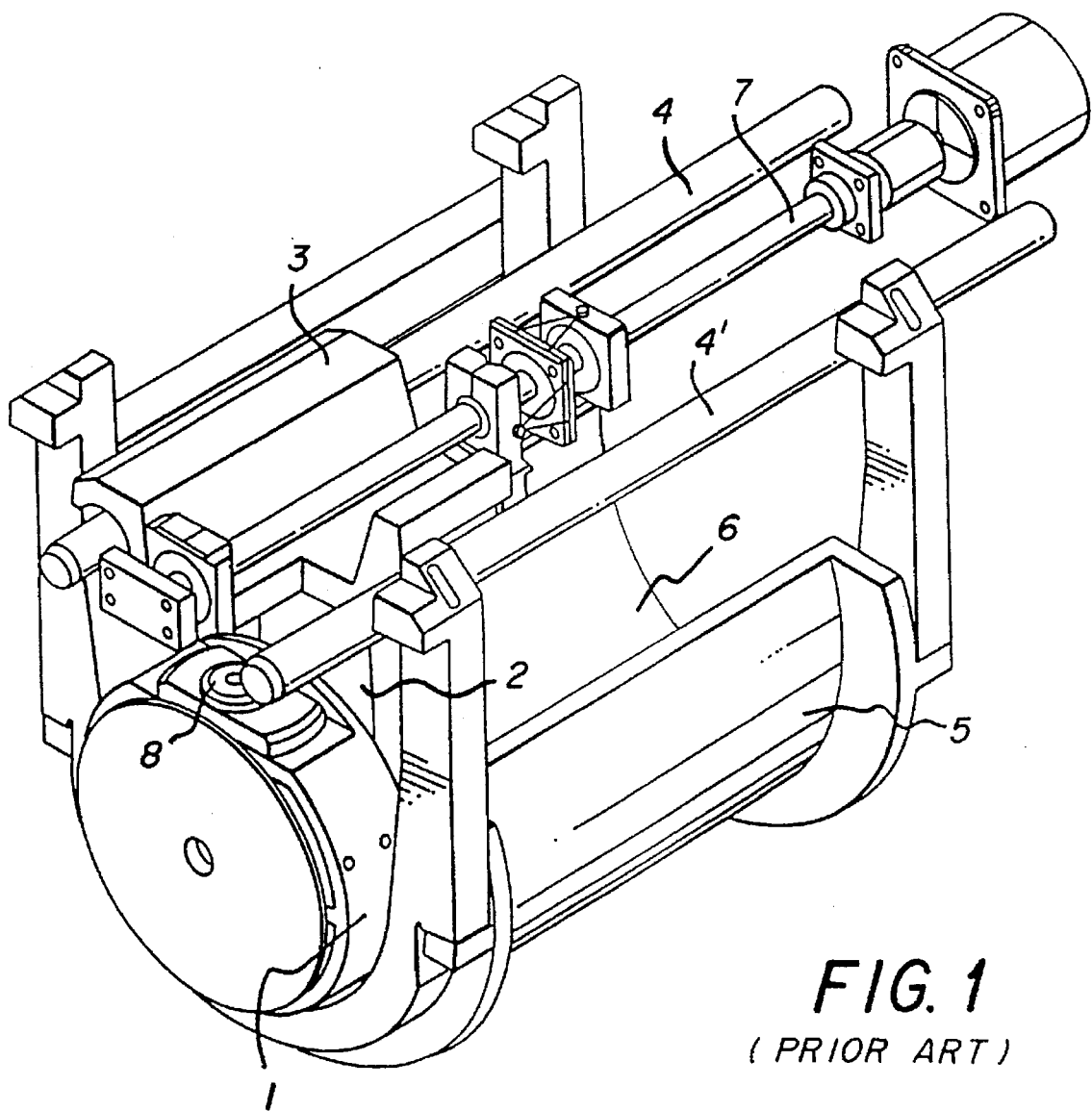
FIG. 1 a perspective view of a rotary printing system according to the prior art.

A rotary printing system employing a multi-position lens assembly is illustrated in FIG. 1, and includes a rotor 1 coupled to a drive motor, not shown, supported by a rotor support member 2 which hangs from a carriage assembly 3 which is supported for movement along a pair of guide rods 4 and 4'. The rotor is arranged to spin and move axially within a cylindrical support shoe 5 which is provided with a sheet of photosensitive material on the inner surface 6 thereof. Rotor 1 is attached to a linear translation assembly comprising rotor support member 2, carriage assembly 3, and a lead screw 7 driven by a stepper motor. See commonly assigned, co-pending U.S. patent application Ser. No. 08/123,838 entitled LEADSCREW COUPLER, filed in the names of Jadrich et al. on Sep. 20, 1993. The disclosure of the Jadrich et al. patent application is hereby specifically incorporated hereinby reference. The rotor is simultaneously rotated by the drive motor in a fast scan direction and is translated past the cylindrical support shoe in the slow scan direction (axially) by the stepper motor and lead screw 7, thereby achieving a raster scan pattern on the photosensitive media held within the support shoe.

An LED printhead assembly 8 is mounted in rotor 1 and comprises a plurality of mono-color light sources such as an array of LED's and a projection lens assembly. The printhead assembly is located within the body of rotor 1 with the LED array package positioned so that the LED aperture output surface is located in a plane which is perpendicular to the optical axis of the projection lens assembly. The projection lens assembly is arranged to simultaneously image (focus) all of the LED's in the array onto a surface located in close proximity above the outer surface of the rotor, and more particularly, onto the inner surface of the photosensitive material held by support shoe 5. A single projection lens array thereby images the plurality of LED's onto the photosensitive material as a plurality of individual images which constitute the writing beams that expose the image pixels. Additional details of the LED array and the generation of pixel control signals can be found in U.S. patent application Ser. No. 08/123,839 entitled METHOD AND APPARATUS FOR EXPOSING PHOTOSENSITIVE MEDIA WITH MULTIPLE LIGHT SOURCES filed in the names of Smith et al. on Sep. 20, 1993. The disclosure of the Smith et al. patent application is hereby specifically incorporated herein by reference.

Figure 2:
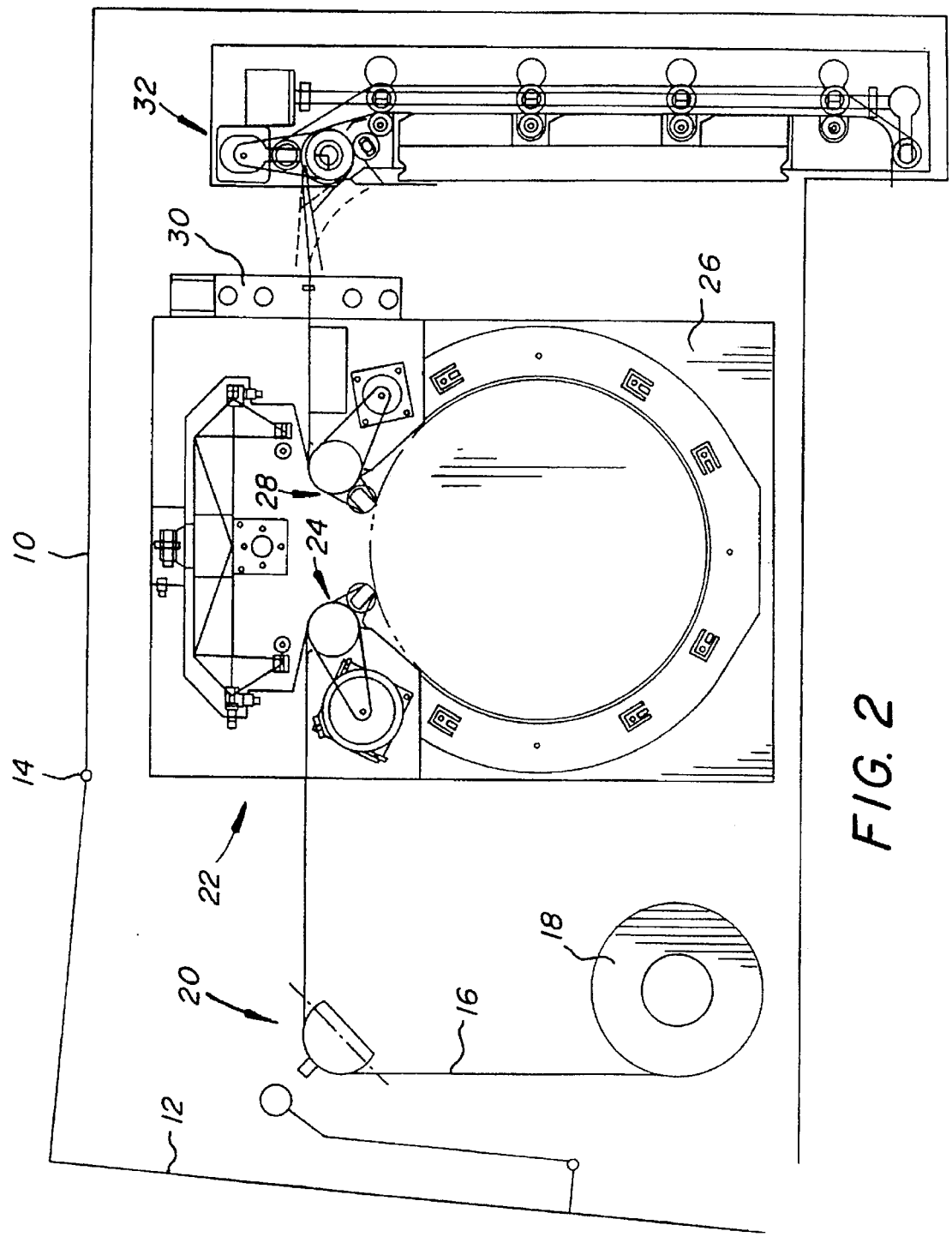
FIG. 2 is a schematic illustration of a printer incorporating a preferred embodiment of the present invention.

FIG. 2 is a schematic illustration of a printer incorporating a preferred embodiment of the present invention. Access into a light-tight cabinet 10 is attained through a door 12, which pivots about a hinge 14. A web of photographic light sensitive media 16 is fed from a roll 18 around an anti-backup device 20, which is further described in commonly assigned, co-pending U.S. patent application Ser. No. 08/371,346, entitled PRINTER WITH SUPPORT SHOE AND MEDIA METERING, THEREIN filed in the name of M. Bridges on Jan. 11, 1995; the disclosure of which is specifically incorporated herein by reference.

From anti-backup device 20, paper is lead to a write station 22 which is disclosed in detail in the above-mentioned U.S. patent application entitled DIGITAL PRINTER WITH SUPPORT SHOE AND TRANSLATABLE MEDIA GUIDE MEMBER THEREIN. Briefly, however, the write station includes a metering mechanism 24, a cylindrical support shoe 26 (corresponding to support shoe 5 in the prior art device of FIG. 1), an exit guide 28, a web-cutting mechanism 30 including a pair of knives, and an exit media guide member disclosed in commonly assigned co-pending U.S. patent application Ser. No. 08/371,347; entitled PRINTER WITH SUPPORT SHOE AND EXIT MEDIA GUIDE MEMBER filed in the name of M. Bridges on Jan. 11, 1995; the disclosure of which is specifically incorporated herein.

Figure 3:
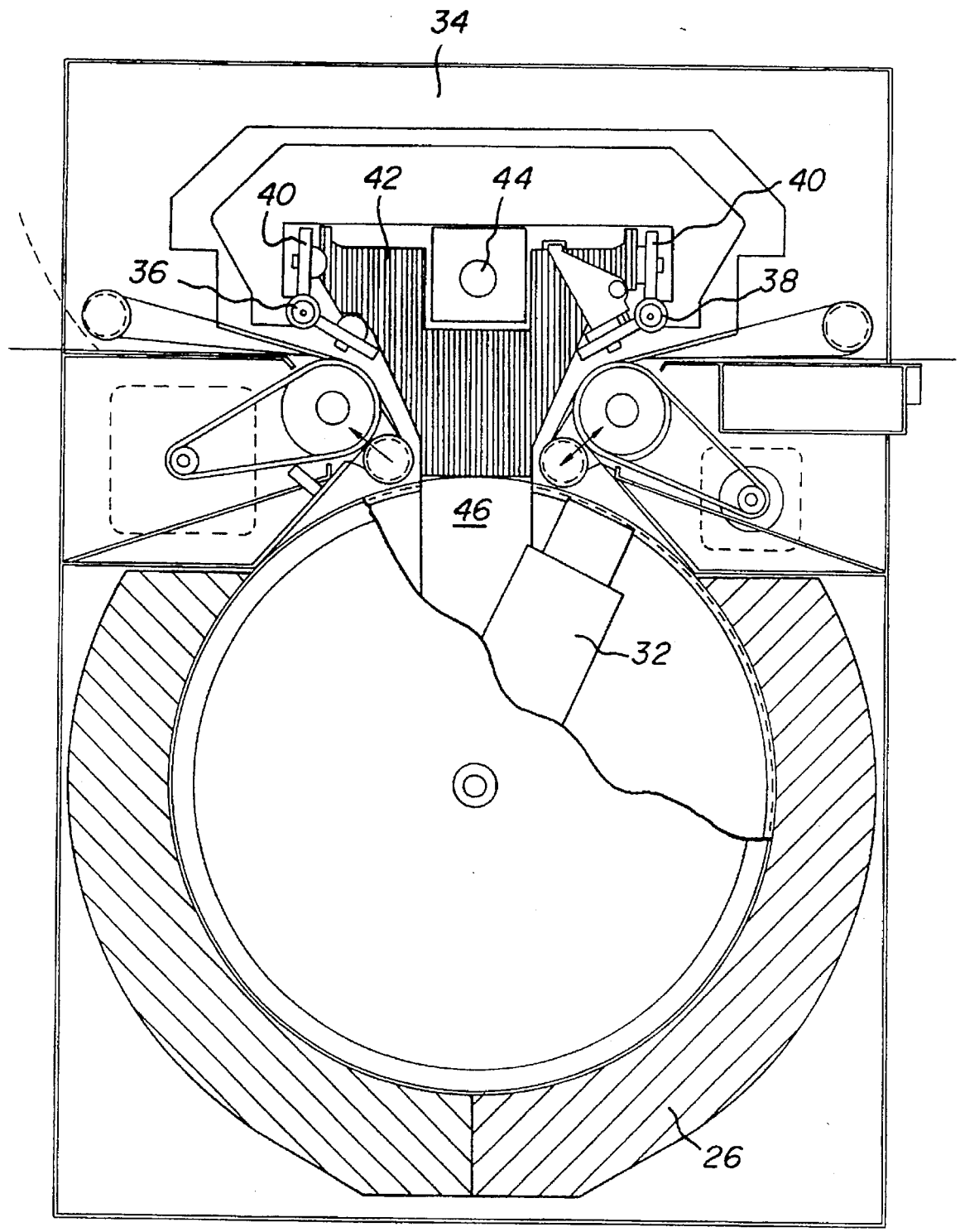
FIG. 3 is an enlarged view of a portion of the printer of FIG. 2.
Figure 4:
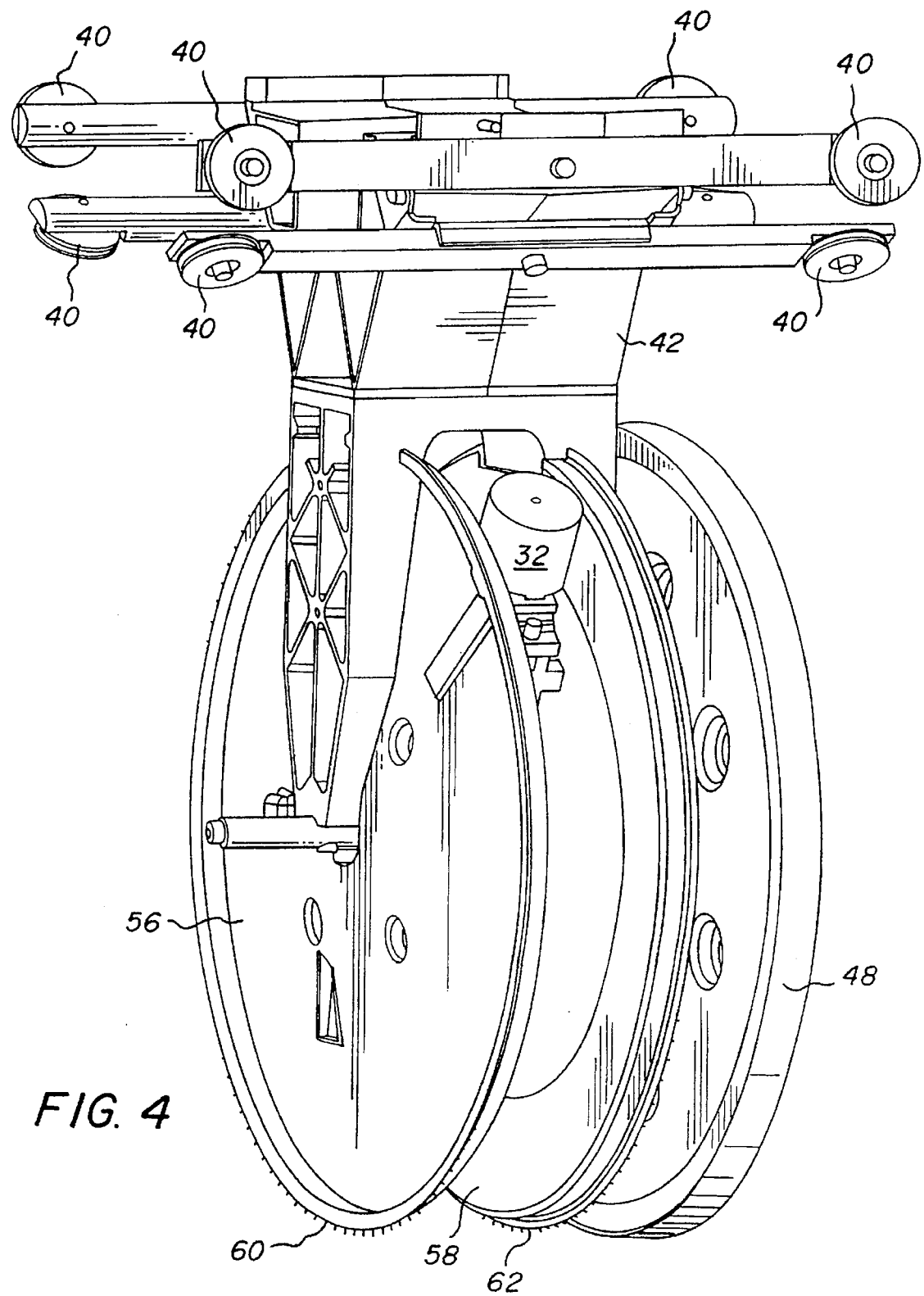
FIG. 4 is an enlarged perspective view of a portion of the printer of FIG. 2.

Referring now to FIG. 3, the arcuate inner surface of cylindrical support shoe 26 is precisely bored so that an LED illumination means, not shown, mounted on a rotor 32 focuses on the emulsion side of media 16. A translator base assembly 34 is attached to framework to support guide rods 36 and 38. As may be best seen in FIG. 4, along with other features now to be mentioned, a plurality of wheels 40 are rotatably attached to a carriage 42 which translates along guide rods 36 and 38 by means of a lead screw 44 turned by a lead screw motor, not shown. See afore-mentioned U.S. patent application Ser. No. 08/123,838 entitled LEADSCREW COUPLER. A rotor support member 46 (corresponding to rotor support member 2 in the prior art device of FIG. 1) is rigidly attached to carriage 42, and carries rotor 32. Also attached to rotor support member 46 is a media guide disc 48 arranged such that a space gap is created between the outer diameter of the media guide disc and the arcuate inner surface of support shoe 26.

A pair of static dissipation members 56 and 58 are mounted on opposed sides of rotor 32 and carry static-dissipating carbon or stainless steel brushes 60 and 62, respectively around their periphery. The tips of the brush bristles will be slightly spaced from the interior surface of media to allow for ionization with the charged medial surface, resulting in effective charge neutralization. Static dissipation members 56 and 58 are illustrated as fixed (non-rotational) to carriage 42, but they could be adapted to rotate, such as with rotor 32. However, it is probably best to not rotate the static dissipation members to make commutation easier, and to reduce problems associated with dust, particulate matter, wear, electrical noise, imbalance, etc. Two static dissipation members 56 and 58 are illustrated so that bi-directional writing can occur with one of the two static dissipation members leading rotor 32. However, single-direction writing would require only a single static dissipation member 56 or 58.

Figure 5:
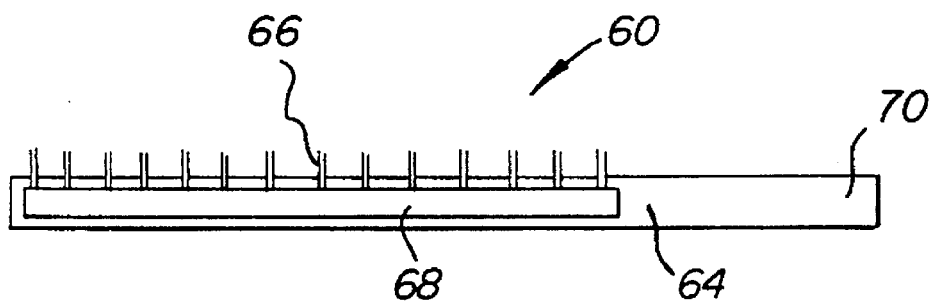
FIG. 5 is detail view of a static dissipating brush, which is a part of the printer of FIG. 2.

Referring to FIG. 5, brushes 60 (and 62 as well) are constructed of a malleable, electrically conductive strip 64 of, say, polymer or metal (aluminum). A portion of the strip has a plurality of bundles 66 of carbon or stainless steel bristles, at intervals along the strip. The bundles are held in a conductive manner to the aluminum strip by means of pressure sensitive adhesive 68. The adhesive may be conductive, but this is not necessary. A portion 70 of strip 64 does not contain bristle bundles or adhesive.

Figure 6:
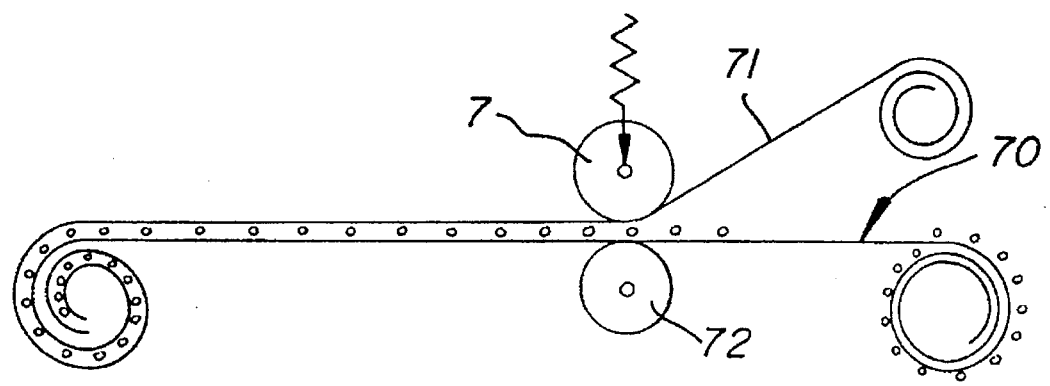
FIG. 6 is a view of the manufacturing process of the static dissipating brush of FIG. 5.

FIG. 6 illustrates a suggested way to manufacture brushes 60 and 62. A series of bristle bundles 66 are distributed along an electrically conductive polymer or metal (aluminum) stock, which will form strip 64. A pressure sensitive adhesive is carried on a release layer 71 that does not adhere well to the adhesive. The release layer and adhesive are applied to strip 64 by a pair of pressure rollers 72 and 74, leaving portion 70 (FIG. 5) un-coated. The brush, with release layer attached is coiled, as illustrated, or cut to length, for storage until needed for final assembly.

Figure 7:
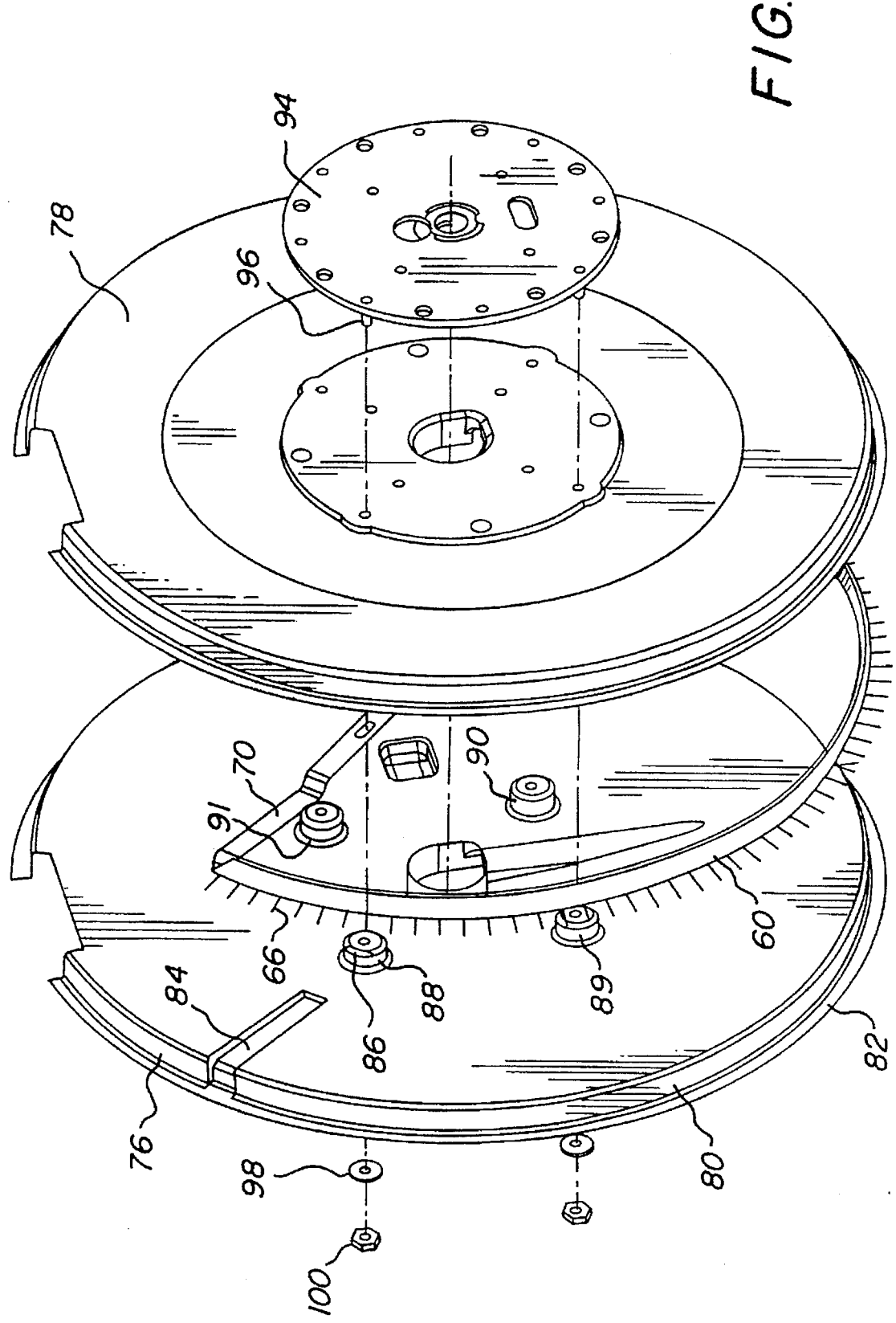
FIG. 7 is an exploded perspective view of a portion of the printer of FIG. 2.

Referring now to FIG. 7, static dissipation member 56 is illustrated in exploded perspective. Static dissipation member 58 is of similar construction. Each comprises a pair of discs 76 and 78 formed of, say, polymer material, by thermoforming or injection molding techniques. The discs may be electrically conductive or insulative.

During assembly, the release layer is peeled from static dissipating brush 60 to expose the adhesive, and the brush is placed around an outer mounting rim 80 of disc 76, with pressure sensitive adhesive facing rim 80. Bristle bundles 66 encounter an outer lip 82 of the disc, and are forced into a radial attitude as bonding proceeds around the rim. Portion 70 of strip 64 is bent (preferable before the release layer is removed) and is dressed along a recessed gutter 84 and through a slot 86 in one of four standoffs 88–91 which are part of disc 76.

Figure 8:
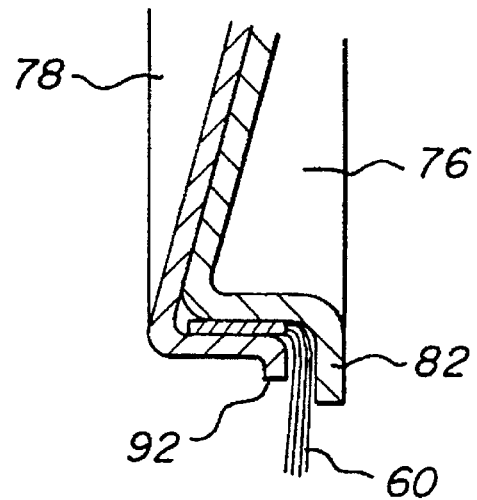
FIG. 8 is a detail view of a region of the portion of the printer of FIG. 2.
Figure 9:
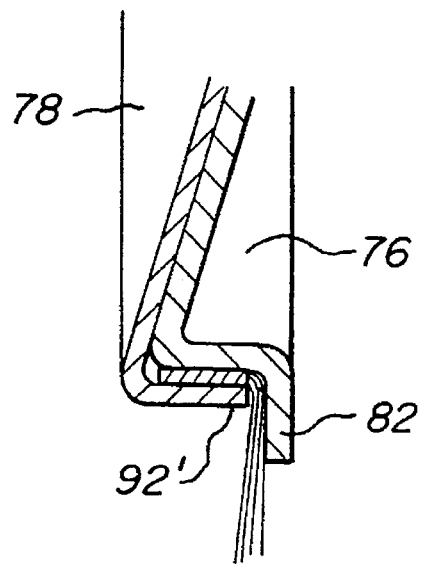
FIG. 9 is a detail view of a second embodiment of the region of the portion of the printer of FIG. 2.

Disc 78 and disc 76 are then joined together such as by bonding. FIG. 8 illustrates that lip 82 of disc 76 and a lip 92 of disc 78 capture brush 60 to aid adhesive in holding the brush in position. Lips 82 and 92 may be the same diameter, but it has been found that the flexible bristle bundles will deform and slide between the two equal diameter lips, becoming trapped. By keeping one of the lips of smaller diameter than the other as shown in FIG. 8, or by doing away with one of the lips as shown in FIG. 9, the bundles are allowed to be re-aligned to their radial positions during final assembly with a device such as a tooth brush should they be mis-aligned during normal handling during sub-assembly.

Referring back to FIG. 7, a bonding agent which is compatible with the disc material is used to cement the discs together. A metal mounting disc 94 incorporating threaded studs 96 which are located through clearance holes in discs 76 and 78 and standoffs 88–91. A washer 98 and hex nut 100 combination is used to fasten onto each of the threaded studs of mounting disc 94.

Figure 10:
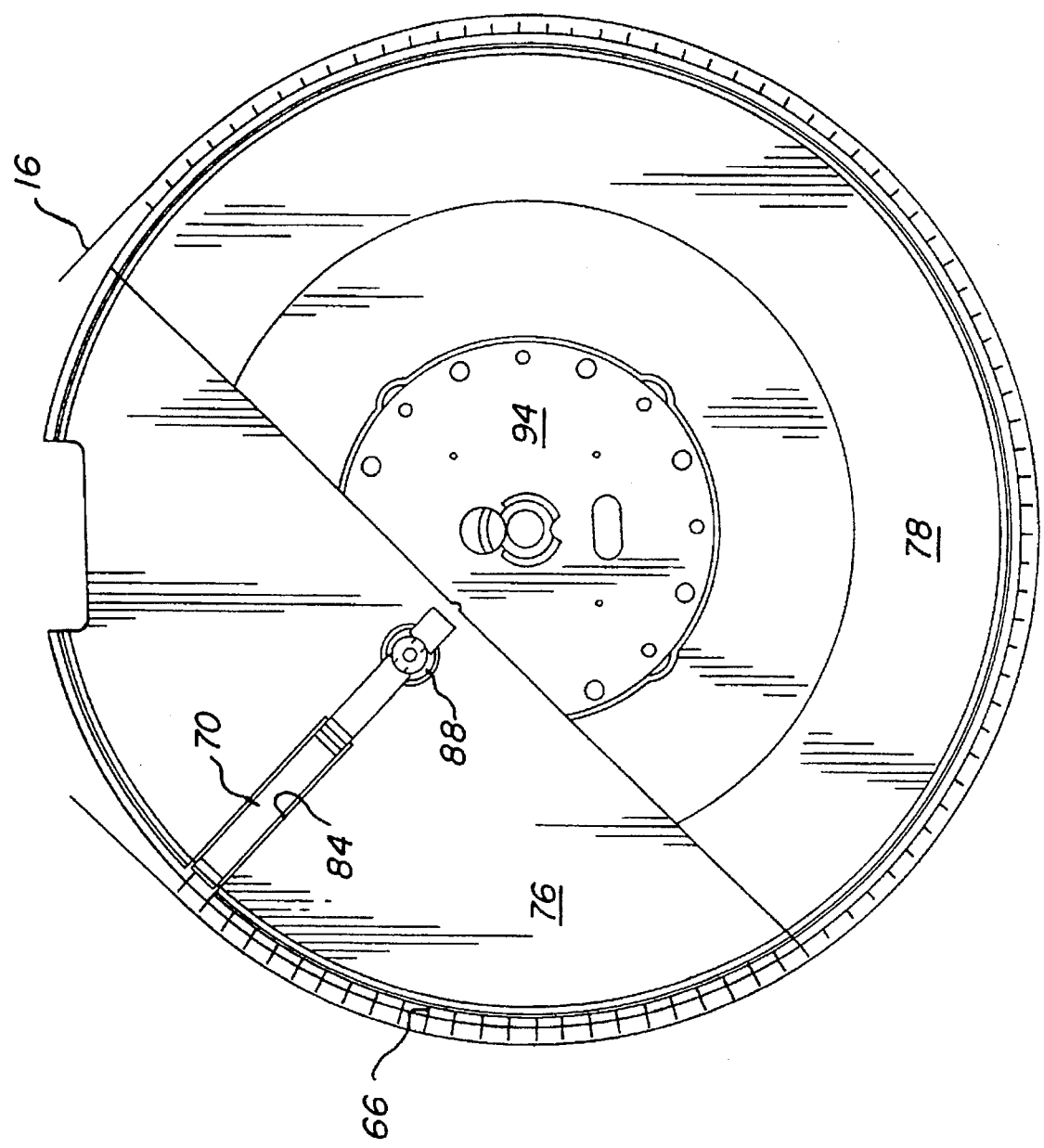
FIGS. 10 and 11 are assembly views, partially in section, of the portion of the printer shown in FIG. 7.
Figure 11:
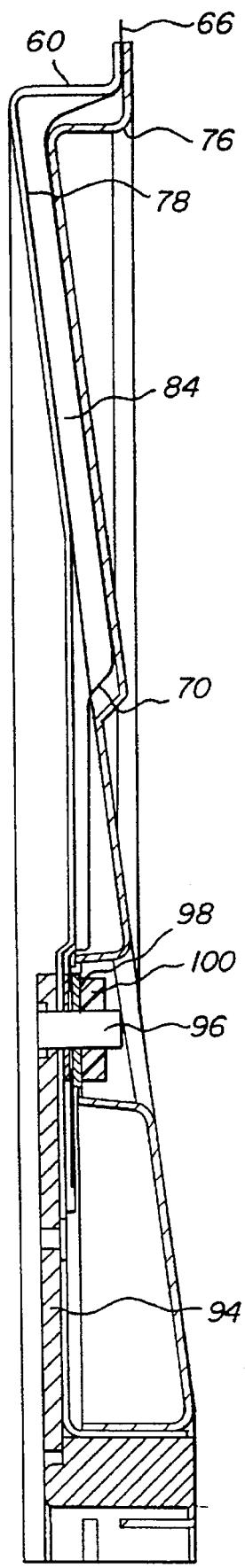

FIGS. 10 and 11 illustrate the final assembly of disc 76. At standoff 88, where portion 70 of the static dissipating brush is exposed, the washer 98 and nut 100 combination provides contact to portion 70 when tightened and secured to the metal mounting disc threaded stud 96. This will provide continuity to the metal mounting disc 94. An electronic circuit board, not shown, is mechanically attached to metal mounting disc 94. The circuit board allows for grounding through copper traces on the circuit board surface.

As the static dissipating discs transport through the support shoe, an electrical stress is created between the media and electrostatic dissipating brushes 60 and 62 in an air gap interface. This is due to the electric field intensity from the charged media surface, which is developed through normal handling and/or mechanical transportation. This electrical stress displaces air molecules and forms ions. These ions are polarized in that they are attracted to the opposite polarity ions near the media surface creating ion pairs. This causes the electric field to collapse and effectively discharges or neutralizes the media surface.

The invention has been described in detail with particular reference to preferred embodiments thereof, but it will be understood that variations and modifications can be effected within the spirit and scope of the invention.

What is claimed is:

1. An imaging apparatus having a support shoe with an at-least-partially cylindrical inner surface for receiving a recording media, a rotor which is simultaneously rotatable about and linearly translated along a fixed axis, a write head assembly carried by the rotor to write on recording media received on the inner surface of the support shoe; said imaging apparatus further comprising:

a support:

a member having an arcuate outer periphery, said member being supported within the support shoe by the support;

means operatively connected to the support for moving the member along the fixed axis relative to the support shoe; and electrically conductive bristles extending radially from the periphery of the member toward the received media to dissipate electrostatic charge build up on the media.

2. An imaging apparatus as set forth in claim 1 wherein the member is connected to the rotor for movement therewith.

3. An imaging apparatus as set forth in claim 1 wherein the member is connected to the rotor so as to lead the rotor as the rotor moves along the axis during a write operation.

4. An imaging apparatus as set forth in claim 1 wherein the bristles extend outwardly from the periphery of the member and are spaced from the received media to create an electrical stress in free air space.

5. An imaging apparatus as set forth in claim 1 wherein there are a pair of such members, one connected to the rotor on each axial side of the rotor so that one of the members leads the rotor as the rotor moves in either axial direction during a write operation.

6. An imaging apparatus as set forth in claim 1 wherein the recording media is light sensitive and the write head writes to the media by image-wise exposing the media to light.

7. An imaging apparatus as set forth in claim 1 wherein the member is rotationally fixed relative to the support shoe.

8. An imaging apparatus as set forth in claim 1 wherein the bristles are attached to an electrically conductive strip that is attached to the periphery of the member.

9. An imaging apparatus as set forth in claim 8 wherein the conductive strip is wrapped along the periphery of the member to lie flat against the periphery, and further comprising means for bending the bristles away from the member.

10. An imaging apparatus as set forth in claim 1 wherein the bristles are attached by adhesive to an electrically conductive strip that is attached to the periphery of the member.

11. An imaging apparatus as set forth in claim 10 wherein the conductive strip is wrapped along the periphery of the member to lie flat against the periphery, and further comprising means for bending the bristles away from the member.

12. An imaging apparatus as set forth in claim 1 wherein the member has a circular outer periphery.

* * * * *